United States Patent
Sugimoto et al.

(10) Patent No.: US 9,916,276 B2
(45) Date of Patent: Mar. 13, 2018

(54) DATA PROCESSING DEVICE, DATA PROCESSING SYSTEM AND METHOD

(71) Applicant: RENESAS ELECTRONICS CORPORATION, Tokyo (JP)

(72) Inventors: Takahiko Sugimoto, Kodaira (JP); Tomohiro Une, Tokyo (JP); Hiroshi Ueda, Kodaira (JP); Ryoji Hashimoto, Kodaira (JP); Toshiyuki Kaya, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 88 days.

(21) Appl. No.: 14/915,621

(22) PCT Filed: Mar. 12, 2015

(86) PCT No.: PCT/JP2015/001374
§ 371 (c)(1),
(2) Date: Feb. 29, 2016

(87) PCT Pub. No.: WO2016/142969
PCT Pub. Date: Sep. 15, 2016

(65) Prior Publication Data
US 2017/0039160 A1   Feb. 9, 2017

(51) Int. Cl.
*G06F 5/00* (2006.01)
*G06F 13/42* (2006.01)
(Continued)

(52) U.S. Cl.
CPC .......... *G06F 13/4221* (2013.01); *G06F 13/00* (2013.01); *G06F 13/4009* (2013.01); *G06F 13/4027* (2013.01)

(58) Field of Classification Search
None
See application file for complete search history.

(56) References Cited

U.S. PATENT DOCUMENTS 6,195,024 B1   2/2001   Fallon
6,285,458 B1   9/2001   Yada
(Continued)

FOREIGN PATENT DOCUMENTS

JP   H10-51642 A     2/1998
JP   2003-299076 A  10/2003
(Continued)

OTHER PUBLICATIONS

International Search Report (ISR) (PCT Form PCT/ISA/210), in PCT/JP2015/001374, dated Jun. 2, 2015 with partial English translation.
Extended European Search Report dated Mar. 27, 2017.

*Primary Examiner* — Cheng-Yuan Tseng
(74) *Attorney, Agent, or Firm* — McGinn IP Law Group, PLLC.

(57) ABSTRACT

A data selector circuit divides a group of data including a plurality of types of data into the plurality of types of data. A first compression circuit and a second compression circuit respectively compress the plurality of types of data in parallel with each other in accordance with each of the plurality of types of data. The first compression circuit compresses data and obtains compressed data. The second compression circuit compresses data and obtains compressed data. The data transmission circuit-transmits the compressed data and the compressed data to a terminal.

20 Claims, 11 Drawing Sheets

(51) Int. Cl.
  *G06F 13/00*    (2006.01)
  *G06F 13/40*    (2006.01)

(56)    References Cited

U.S. PATENT DOCUMENTS

| | | | |
|---|---|---|---|
| 7,176,966 B2 * | 2/2007 | Inoue | .................. H04N 5/217 |
| | | | 348/222.1 |
| 7,190,284 B1 | 3/2007 | Dye et al. | |
| 2002/0101609 A1 | 8/2002 | Fan | |
| 2003/0202578 A1 | 10/2003 | Shibata et al. | |
| 2014/0169480 A1 | 6/2014 | Lachine et al. | |

FOREIGN PATENT DOCUMENTS

| | | |
|---|---|---|
| JP | 2005-500709 A | 1/2005 |
| JP | 2012-085350 A | 4/2012 |
| JP | 2014-016863 A | 1/2014 |

* cited by examiner

DATA PROCESSING DEVICE, DATA PROCESSING SYSTEM AND METHOD

TECHNICAL FIELD

The present invention relates to a data processing device, a data processing system and method and, for example, relates to a data processing device, a data processing system and method that compress and transmit data.

BACKGROUND ART

In order to increase the efficiency of data transmission when acquiring data and transmitting the acquired data to a terminal, a technique that compresses the data to reduce the amount of data and transmits the compressed data is used. For example, image data is acquired from a device such as a camera, and the image data is compressed and transmitted to a terminal. An example of application of this technique is displaying an image taken by an in-vehicle camera such as a back monitor or a top view monitor of an automobile or the like on a display or the like. In such a technique, it is necessary to reduce a time lag between the timing when an image is captured by the camera and the timing when the image is displayed on the display (to reduce latency). In this case, it is possible to increase the transmission speed from the camera to the display by compressing and transmitting the image data from the camera.

In relation to the above technique, Patent Literature 1 discloses an image transmission device that can transmit image data to a network and store the image data in HDD at the same time by an encoding circuit and a compression means in a single system. Because the technique disclosed in Patent Literature 1 sorts the compressed data in order of compression and stores them in a compressed data storage means, and then reads the compressed data from the compressed data storage means in response to a request from a terminal, it is possible to transmit individual compressed data to each terminal.

CITATION LIST

Patent Literature

PTL1: Japanese Unexamined Patent Publication No. 2003-299076

SUMMARY OF INVENTION

Technical Problem

Recently, it has become possible to transmit a plurality of types of data, such as image data and other data (e.g., distance data), from a device like a camera. It is thus required to transmit a plurality of types of data to a terminal with low latency.

However, according to the technique disclosed in Patent Literature 1, because there is only one path for compression, only one data can be compressed at a time. Thus, in the technique disclosed in Patent Literature 1, there is a possibility that latency may be degraded when a plurality of types of data are being transferred.

The other problems and novel features of the present invention will become apparent from the description of the specification and the accompanying drawings.

Solution to Problem

According to one embodiment, a data processing device includes a data selector circuit that divides a group of data including a plurality of types of data into the plurality of types of data, a plurality of compression circuits that compress the plurality of types of data in parallel with each other in accordance with each of the plurality of types of data, and a data transmission circuit that transmits the plurality of types of compressed data to a terminal.

Advantageous Effects of Invention

According to the embodiment described above, it is possible to transfer a plurality of types of data with low latency.

DESCRIPTION OF EMBODIMENTS

Figure 1:
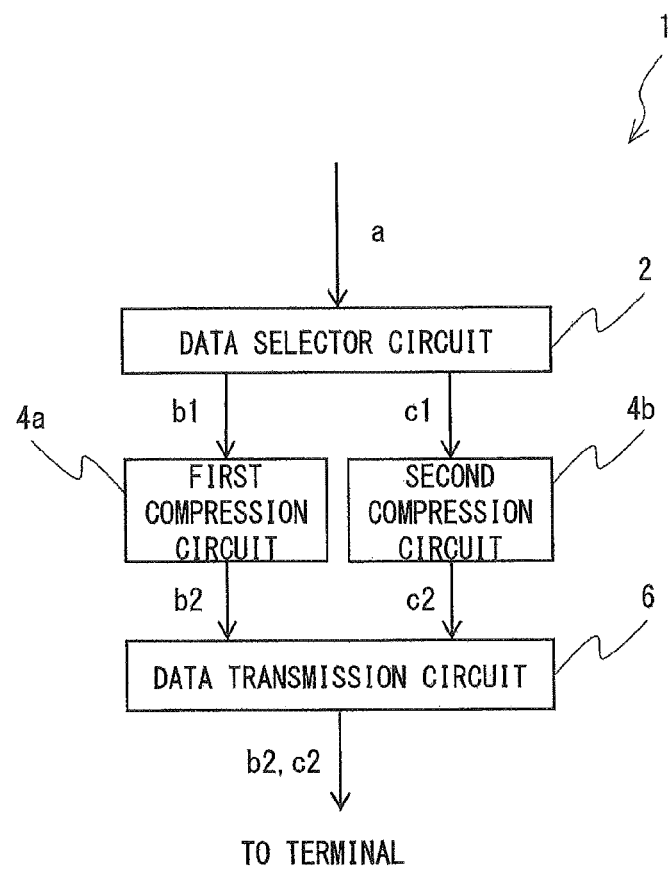
FIG. 1 is a view showing the overview of a data processing device according to an embodiment.

Embodiments of the invention will be described hereinbelow. The following description and the attached drawings are appropriately shortened and simplified to clarify the explanation. In the figures, the identical reference symbols denote identical structural elements and the redundant explanations thereof are omitted.

In the following embodiments, the description will be divided into a plurality of sections or embodiments when necessary for the sake of convenience. However, unless explicitly specified otherwise, those sections or embodiments are by no means unrelated to each other, but are in such a relation that one represents a modification, a detailed or supplementary description, etc. of a part or whole of the other. Further, in the following embodiments, when a reference is made to the number etc, (including the number, numeric value, quantity, range, etc.) of elements, except in such cases where it is explicitly specified otherwise or the number is obviously limited to a specific number in principle, the number is not limited to the specific number but may be greater or less than the specific number.

It is needless to mention that, in the following embodiments, their constituent elements (including operation steps) are not necessarily essential, except in such cases where it is explicitly specified otherwise or they are obviously considered to be essential in principle. Likewise, in the following embodiments, when a reference is made to the shape, relative position, etc. of a constituent element or the like, this includes those shapes etc. substantially resembling or similar to that shape etc., except in such cases where it is explicitly specified otherwise or it is obviously considered otherwise in principle. The same applies to the number etc, (including the number, numeric value, quantity, range, etc.) mentioned above.

Further, elements that are shown as functional blocks for performing various kinds of processing in the drawings may be configured by a CPU (Central Processing Unit), memory or another circuit as hardware or may be implemented by a program loaded into memory or the like as software. It would thus be obvious to those skilled in the art that these functional blocks may be implemented in various forms such as hardware only, software only or a combination of these, and not limited to either one.

Further, the above-described program can be stored in and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Overview of Embodiment

Prior to describing this embodiment, an overview of this embodiment is given hereinafter. FIG. 1 is a view showing the overview of a data processing device 1 according to an embodiment. As shown in FIG. 1, the data processing device 1 includes a data selector circuit 2, a first compression circuit 4a, a second compression circuit 4b, and a data transmission circuit 6. Note that, although two compression circuits (the first compression circuit 4a and the second compression circuit 4b) are shown in FIG. 1, the number of compression circuits may be three or more. Further, although, for example, the first compression circuit 4a performs irreversible compression and the second compression circuit 4b performs reversible compression, it is not limited thereto. The first compression circuit 4a may perform reversible compression and the second compression circuit 4b may perform irreversible compression. Further, both the first compression circuit 4a and the second compression circuit 4b may perform irreversible compression, or both of them may perform reversible compression.

The data selector circuit 2 divides a group of data a including a plurality of types of data into a plurality of types of data b1 and c1. The first compression circuit 4a and the second compression circuit 4b compress the plurality of types of data b1 and c1 in parallel with each other in accordance with each type of the plurality of types of data b1 and c1. To be specific, the first compression circuit 4a compresses the data b1 and obtains compressed data b2. The second compression circuit 4b compresses the data c1 and obtains compressed data c2.

The data transmission circuit 6 transmits the plurality of types of compressed data to a terminal. Specifically, the data transmission circuit 6 transmits the compressed data b2 and the compressed data c2 to the terminal. The data transmission circuit 6 may transmit the compressed data b2 and the compressed data c2 at the same timing or at different timings.

Because the data processing device 1 according to this embodiment divides a group of data a including a plurality of types of data in accordance with the type of data and compresses the divided data in parallel with each other, latency when transmitting them to the terminal is improved. Thus, the data processing device 1 according to this embodiment can transfer a plurality of types of data with low latency.

For example, in a driving support system such as aback monitor or a top view monitor of an automobile or the like, it is required to transfer data from a camera to a display with low latency (with a small difference between the actual motion and the motion when camera images are displayed on a display or the like). Further, there is an increasing need to acquire not only surrounding images but also data such as a distance to an object or a person in the vicinity of an automobile at the same time, as in an automatic braking system or a cruise control system. As described above, because the data processing device 1 according to this embodiment can transfer a plurality of types of data with low latency, it can be effectively applied to the above system.

First Embodiment

Figure 2:
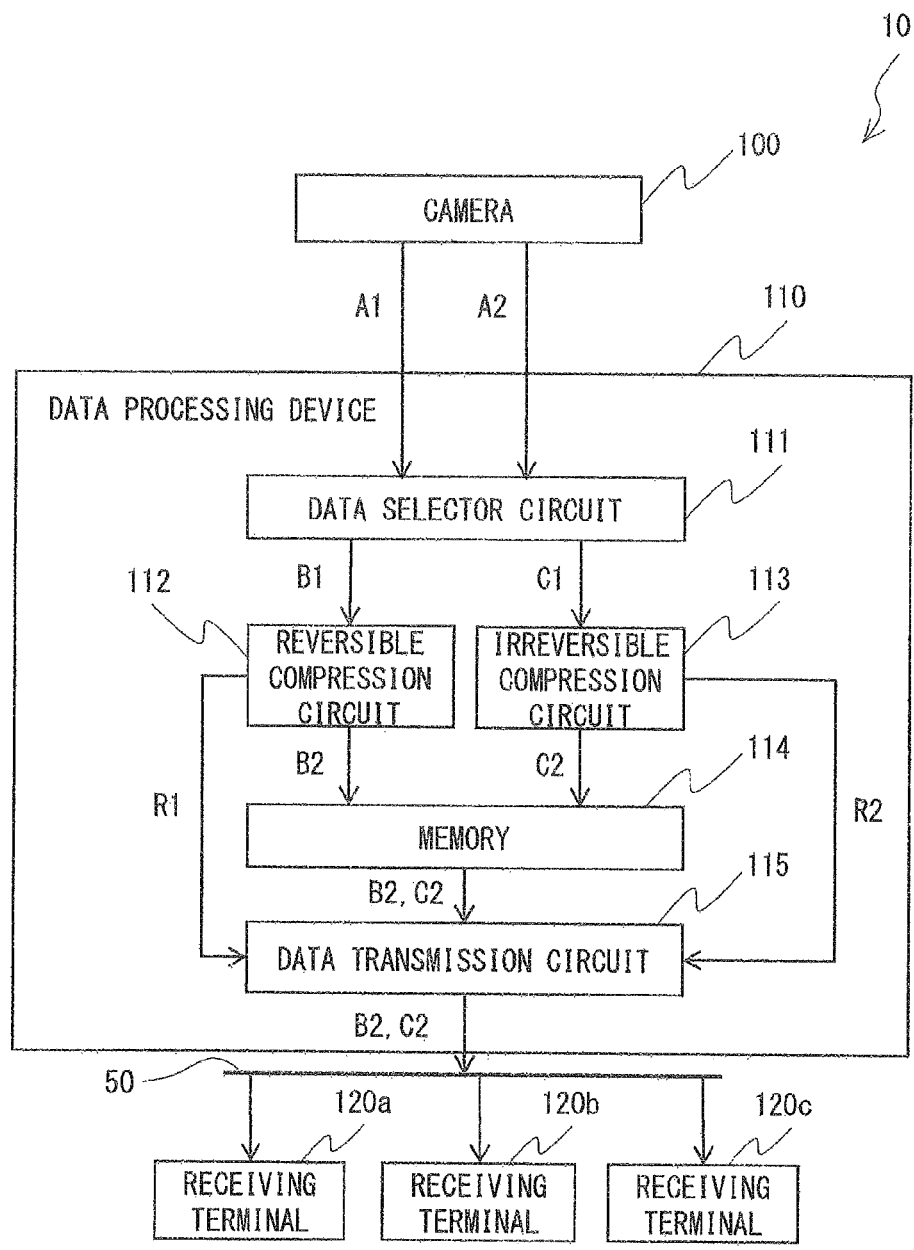
FIG. 2 is a view showing a data processing system according to a first embodiment.

FIG. 2 is a view showing a data processing system 10 according to a first embodiment. The data processing system 10 includes a camera 100, a data processing device 110 and a receiving terminal 120 (receiving terminals 120a, 120b and 120c). The data processing device 110 is connected to be able to communicate with the receiving terminal 120 through a communication line 50 such as, for example, a bus. The data processing device 110 includes a data selector circuit 111, a reversible compression circuit 112, an irreversible compression circuit 113, a memory 114, and a data transmission circuit 115.

The camera 100 can output a plurality of different types of data at the same timing. Specifically, the camera 100 outputs a group of data including a plurality of different types of data. In this embodiment, the camera 100 outputs camera data A1 as a group of data to the data processing device 110. The camera data A1 is image data such as, for example, YUV color image data, IR (infrared) image data, distance data and the like. Although the camera data A1 is transmitted through one data bus in this example, the number of data buses is not limited. The camera 100 further outputs a data control signal A2 related to the camera data A1 to the data processing device 110. The data control signal A2 is described later.

The data selector circuit 111 divides data that is output from the camera 100 from which the data is transmitted based on the data control signal A2. To be specific, the data selector circuit 111 analyzes the camera data A1 by a predetermined setting and divides it into data B1 for which reversible compression is effective and data C1 for which irreversible compression is effective. The data for which reversible compression is effective is data that is required not to vary before and after compression. On the other hand, the data for which irreversible compression is effective is data that is allowed to vary before and after compression, and thus the compressibility of this data can increase by irreversible compression.

The reversible compression circuit 112 and the irreversible compression circuit 113 are circuits for performing reversible compression and irreversible compression, respectively, on each of the divided data. The reversible compression circuit 112 and the irreversible compression circuit 113 perform compression in parallel with each other respectively on a plurality of types of divided data. Note that, although the data processing device 110 includes the reversible compression circuit 112 and the irreversible compression circuit 113 in this embodiment, it is not limited thereto. Both of the two compression circuits may perform reversible compression, or both of them may perform irreversible compression.

The reversible compression circuit 112 performs compression on the data B1 in a reversible compression format (e.g., Zip, gzip etc.). Then, the reversible compression circuit 112 stores the obtained compressed data B2 in the memory 114. At this time, the reversible compression circuit 112 outputs a data transmission request signal R1 that reports the completion of compression to the data transmission circuit 115. The data transmission request signal R1 contains information that specifies an area where the compressed data B2 is stored in the memory 114.

The irreversible compression circuit 113 performs compression on the data C1 in an irreversible compression format (e.g., JPEG, MPEG-2 etc.). Then, the irreversible compression circuit 113 stores the obtained compressed data C2 in the memory 114. At this time, the irreversible compression circuit 113 outputs a data transmission request signal R2 that reports the completion of compression to the data transmission circuit 115. The data transmission request signal R2 contains information that specifies an area where the compressed data C2 is stored in the memory 114.

The data transmission circuit 115 receives the data transmission request signal R1 from the reversible compression circuit 112 and then reads the compressed data B2 from the memory 114. To be specific, the data transmission circuit 115 reads the compressed data B2 from the area that is specified by the data transmission request signal R1 in the memory 114. Then, the data transmission circuit 115 transmits the read compressed data B2 to the receiving terminal 120 through the communication line 50. Likewise, the data transmission circuit 115 receives the data transmission request signal R2 from the irreversible compression circuit 113 and then reads the compressed data C2 from the memory 114. To be specific, the data transmission circuit 115 reads the compressed data C2 from the area that is specified by the data transmission request signal R2 in the memory 114. Then, the data transmission circuit 115 transmits the read compressed data C2 to the receiving terminal 120 through the communication line 50.

The data transmission circuit 115 may transmit the compressed data B2 and the compressed data C2 separately from each other. Specifically, for example, the data transmission circuit 115 may transmit the compressed data B2 upon receiving the data transmission request signal R1 and then transmit the compressed data C2 upon receiving the data transmission request signal R2 after that. In this manner, the data transmission circuit 115 may transmit the compressed data sequentially to the receiving terminal 120. Further, the data transmission circuit 115 can transmit a plurality of frames at the same time. Note that the data transmission circuit 115 may transmit the compressed data B2 and the compressed data C2 at the same time. Specifically, the data transmission circuit 115 may store the compressed data B2 and the compressed data C2 in one or more communication frames and transmit these communication frames at the same time. In this case, the data transmission circuit 115 may include a buffer for storing data that has been previously compressed.

The receiving terminal 120 is a control chip or a computer (PC) to which, for example, a display is connected. The receiving terminal 120 receives the compressed data B2 and the compressed data C2 transmitted from the data processing device 110. Then, the receiving terminal 120 decompresses the compressed data B2 and C2 to the original data B1 and C1 and performs necessary processing such as displaying image data on a display.

A flow of a process of the data processing device 110 is described hereinafter.

Figure 3:
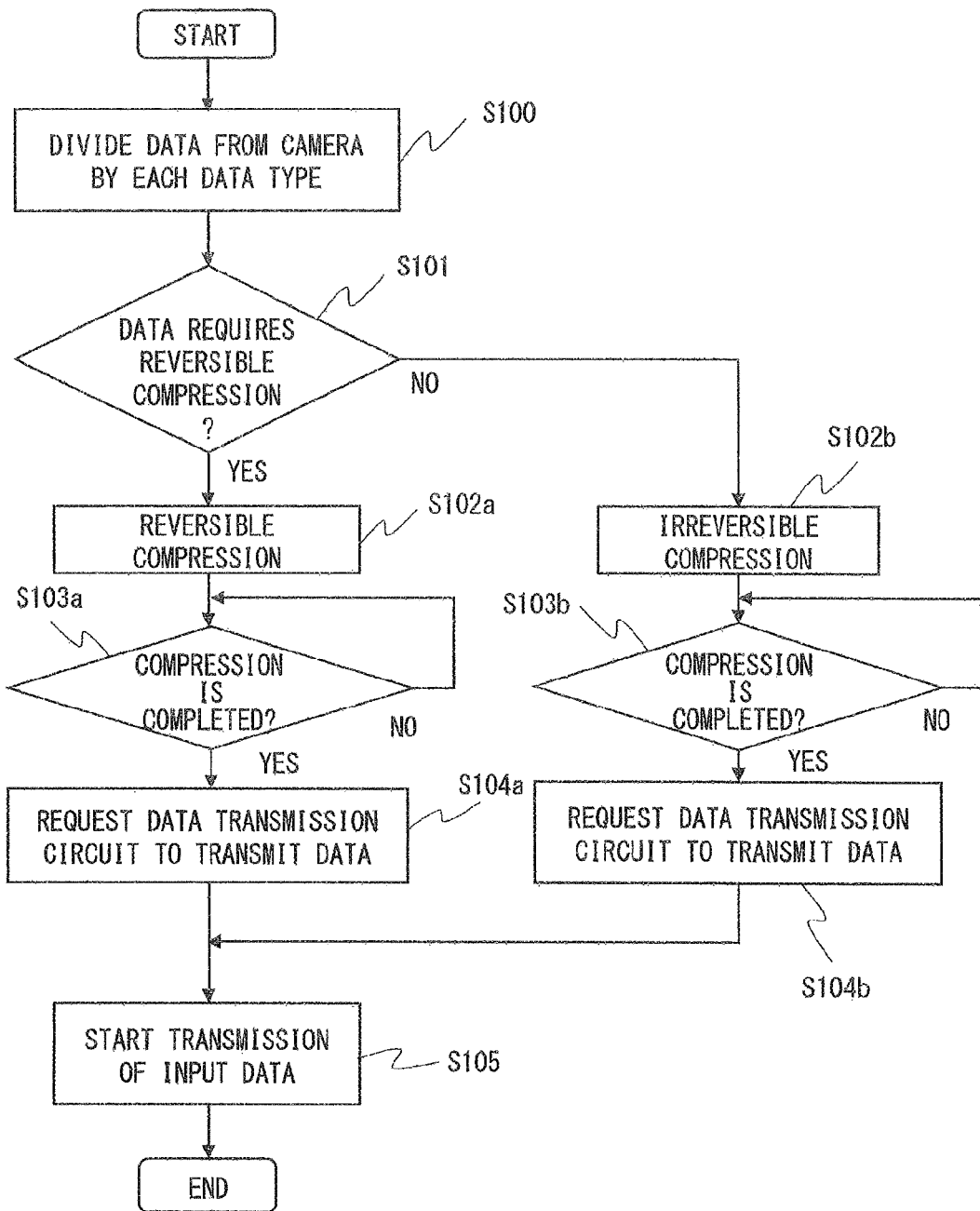
FIG. 3 is a flowchart showing a data processing method in the data processing device according to the first embodiment.

FIG. 3 is a flowchart showing a data processing method in the data processing device 110 according to the first embodiment. First, the data selector circuit 111 divides the camera data A1 that includes a plurality of different types of data by each type of data based on the data control signal A2 (S100).

Next, when the divided data is data requiring reversible compression (YES in S101), the data processing device 110 performs reversible compression on the data (S102a). On the other hand, when the divided data is data not requiring reversible compression (NO in S101), the data processing device 110 performs irreversible compression on the data (S102b). To be specific, the data selector circuit 111 divides the camera data A1 into the data B1 for which reversible compression is effective and the data C1 for which irreversible compression is effective. Then, the data selector circuit 111 outputs the data B1 to the reversible compression circuit 112 and outputs the data C1 to the irreversible compression circuit 113. The reversible compression circuit 112 performs reversible compression on the data B1. Further, the irreversible compression circuit 113 performs irreversible compression on the data C1.

The data control signal A2 that is output from the camera 100 contains a Valid signal indicating that the camera data A1 that is output at the same timing as that of the output of the data control signal A2 is valid data, for example. Thus, when the data selector circuit 111 receives the data control signal A2 containing the Valid signal, it performs processing on the camera data A1 that is output at the same timing as that of the output of the data control signal A2. The data selector circuit 111 can thereby perform processing at an appropriate timing. In other words, when the data selector circuit 111 receives invalid data such as the one output when the camera 100 is in the idle mode, it can refrain from performing processing on the data.

Further, the camera data A1 contains, for example, YUV color image data, distance data and the like, as described above. The YUV color image data is image data indicating a color image to be viewed by a user in the receiving terminal 120. When a person views an image, even if the image data slightly changes before and after compression, the person hardly recognizes the change. Thus, because a change in data by compression has little influence on the YUV color image data, to perform irreversible compression in order to increase the compressibility is effective. Accordingly, the data selector circuit 111 classifies the YUV color image data as the data C1 for which irreversible compression is effective.

On the other hand, distance data (numeric data indicating the distance from the camera 100 to an object) is used for a computation circuit such as a CPU to perform calculation in the receiving terminal 120. Thus, for the distance data, it is required that the data not change before and after compression. Thus, to perform reversible compression on the distance data is effective. Accordingly, the data selector circuit 111 classifies the distance data as the data B1 for which reversible compression is effective.

Note that IR image data is used to be viewed by a user in the receiving terminal 120 in some cases and used to be computed in the receiving terminal 120 in other cases. Thus, the data selector circuit 111 may classify the IR image data as the data B1 or the data C1 according to the usage in the receiving terminal 120.

Note that the data control signal A2 may contain information that specifies a data structure of the camera data A1. This is suitable for the case where the camera 100 can output the data control signal A2 containing such information. To be specific, when, for example, the camera data A1 is 24 bits, the high 8 bits of the camera data A1 is the data B1 (e.g., distance data), and the low 16 bits of the camera data A1 is the data C1 (e.g., image data), the data control signal A2 may contain information indicating that. Then, the data selector circuit 111 divides the camera data A1 into the data B1 for which reversible compression is effective and the data C1 for which irreversible compression is effective by using the information that specifies the data structure. In this configuration, the data selector circuit 111 can easily divide the camera data A1.

Further, information that specifies the data structure of the camera data A1 may be preset to the data selector circuit 111. To be specific, when the specifications of the camera 100 are known, information that specifies the structure of the camera data A1 may be set to the data selector circuit 111 in accordance with the specifications. In this configuration, there is no need to specify the data structure in the data control signal A2. On the other hand, by specifying the data structure in the data control signal A2, there is no need to preset the information to the data selector circuit 111.

The data B1 and the data C1 that are classified in the data selector circuit 111 are input to the reversible compression circuit 112 and the irreversible compression circuit 113, respectively. The reversible compression circuit 112 and the irreversible compression circuit 113 that respectively receive the data B1 and the data C1 perform data compression in accordance with the predetermined setting. Note that the timings when the data B1 and the data C1 are respectively input to the reversible compression circuit 112 and the irreversible compression circuit 113 may be the same. Then, the reversible compression circuit 112 and the irreversible compression circuit 113 perform the data compression in parallel. Specifically, the processing steps of S102a and S102b are performed in parallel with each other.

The reversible compression circuit 112 continues the compression processing until the compression is completed (NO in S103a). When the compression is completed (YES in S103a), the reversible compression circuit 112 outputs the obtained compressed data B2 to the memory 114 and writes the compressed data B2 in a predetermined area in the memory 114. At this time, the reversible compression circuit 112 outputs the data transmission request signal R1 to the data transmission circuit 115 and thereby requests the data transmission circuit 115 to transmit data (S104a).

Likewise, the irreversible compression circuit 113 continues the compression processing until the compression is completed (NO in S103b). When the compression is completed (YES in S103b), the irreversible compression circuit 113 outputs the obtained compressed data C2 to the memory 114 and writes the compressed data C2 in a predetermined area in the memory 114. At this time, the irreversible compression circuit 113 outputs the data transmission request signal R2 to the data transmission circuit 115 and thereby requests the data transmission circuit 115 to transmit data (S104b). Note that the processing steps of S102a, S103a and S104a are performed in parallel with the processing steps of S102b, S103b and S104b.

The data transmission circuit 115 starts transmission of the compressed data input from the memory 114 (S105). To be specific, when the data transmission circuit 115 receives the data transmission request signal R1, it extracts the compressed data B2 from the memory 114 and transmits it to the receiving terminal 120. On the other hand, when the data transmission circuit 115 receives the data transmission request signal R2, it extracts the compressed data C2 from the memory 114 and transmits it to the receiving terminal 120. Note that the data transmission circuit 115 can transmit a plurality of frames of data to a plurality of receiving terminals 120 at the same time.

The time it takes for both of the two compressed data B2 and C2 to be output from the memory 114 to the data transmission circuit 115 is generally shorter than the time required for one-time compression. Thus, the data transmission circuit 115 can receive the compressed data B2 and C2 before the next compressed data are output from the reversible compression circuit 112 and the irreversible compression circuit 113. It is thereby possible to prevent the data loss of the compressed data. Note that, even if the time it takes for the two compressed data B2 and C2 to be output from the memory 114 to the data transmission circuit 115 is equal to or longer than the time required for one-time compression, because the memory 114 temporarily stores the compressed data, it is possible to prevent the data loss regardless of the timing it takes to transmit the compressed data. Further, because the memory 114 temporarily stores the compressed data, the data transmission circuit 115 can transmit the compressed data B2 and the compressed data C2 to the receiving terminal 120 at an arbitrary timing. For example, the data transmission circuit 115 can transmit the compressed data B2 and the compressed data C2 to the receiving terminal 120 at the same time. Alternatively, the data transmission circuit 115 can transmit the compressed data B2 and the compressed data C2 to the receiving terminal 120 at the timing when the receiving terminal 120 requires the data.

In the above-mentioned Patent Literature, when processing a plurality of types of data, until the processing of one data ends and the selector is switched, the next data cannot be processed. Further, because during the period when one data is compressed, another data cannot be compressed, it takes a long time to transmit all data.

On the other hand, the data processing device 110 according to this embodiment includes the data selector circuit 111 that divides a plurality of types of data and includes two compression circuits that are placed in parallel with each other. In other words, there are a plurality of paths for compression in this embodiment. Accordingly, each of a plurality of types of divided data can be compressed in parallel with each other. It is thereby possible to reduce the latency when transferring a plurality of types of data compared with the case where a plurality of data are sequentially compressed.

Further, the data processing device 110 according to this embodiment includes two compression circuits that perform compression in different compression formats. Specifically, in this embodiment, a first compression circuit (the irreversible compression circuit 113 in this embodiment) performs compression in a first format (an irreversible compression format in this embodiment) on a first type of data (image data in this embodiment). On the other hand, a second compression circuit (the reversible compression circuit 112 in this embodiment) performs compression in a second format (a reversible compression format in this embodiment) which is different from the first format on a second type of data (distance data in this embodiment). In this configuration, even when a plurality of different types of data are input, it is possible to compress these data by a compression method that is suitable for the usage of each data in accordance with the type of the data.

Furthermore, the data processing device 110 according to this embodiment includes the reversible compression circuit 112 and the irreversible compression circuit 113 in parallel with each other. In this configuration, it is possible to perform compression in an irreversible compression format and compression in a reversible compression format in parallel with each other.

Further, because only one compression circuit is placed in the above-mentioned Patent Literature, even when a plurality of types of data are input, either one of an irreversible compression format and a reversible compression format can be selected. On the other hand, the data processing device 110 according to this embodiment can process data to be viewed by a user in the receiving terminal 120 (a first type of data) such as image data and data to be computed in the receiving terminal 120 (a second type of data) such as distance data separately from each other. As described earlier, for the image data such as YUV color image data, even if the image data slightly changes before and after compression, a person hardly recognizes the change. On the other hand, for the distance data, because it is used for operations such as calculation in the receiving terminal 120, it is required that the data not change before and after compression. Therefore, the data processing device 110 according to this embodiment can perform irreversible compression on the image data so as to increase the compressibility and perform reversible compression on the distance data so as not to cause a change in the data.

Further, in the above-described embodiment, the reversible compression circuit 112 and the irreversible compression circuit 113 respectively output the data transmission request signals R1 and R2 to the data transmission circuit 115, and the data transmission circuit 115 transmits the compressed data based on the data transmission request signals R1 and R2. Stated differently, a series of data processing operations from the compression of the data A1 input from the camera 100 to the transmission of the compressed data to the receiving terminal 120 are performed without using CPU processing. In this configuration, it is possible to perform the compression of data and the transfer of data by using hardware without any software processing such as processing by a CPU, which enables high-speed processing.

In the case where software processing by a CPU is performed, it is required to perform interrupt processing on the CPU when the compression is completed. At this time, the CPU needs to perform interrupt processing and bus access processing and access the data transmission circuit. On the other hand, in the configuration of this embodiment, the data transmission request signals R1 and R2 (completion flags) are directly input from the reversible compression circuit 112 and the irreversible compression circuit 113 to the data transmission circuit 115. This eliminates the need for the interrupt processing and the bus access processing in the CPU, and it is thereby possible to achieve high-speed processing.

Alternative Example of First Embodiment

Figure 4:
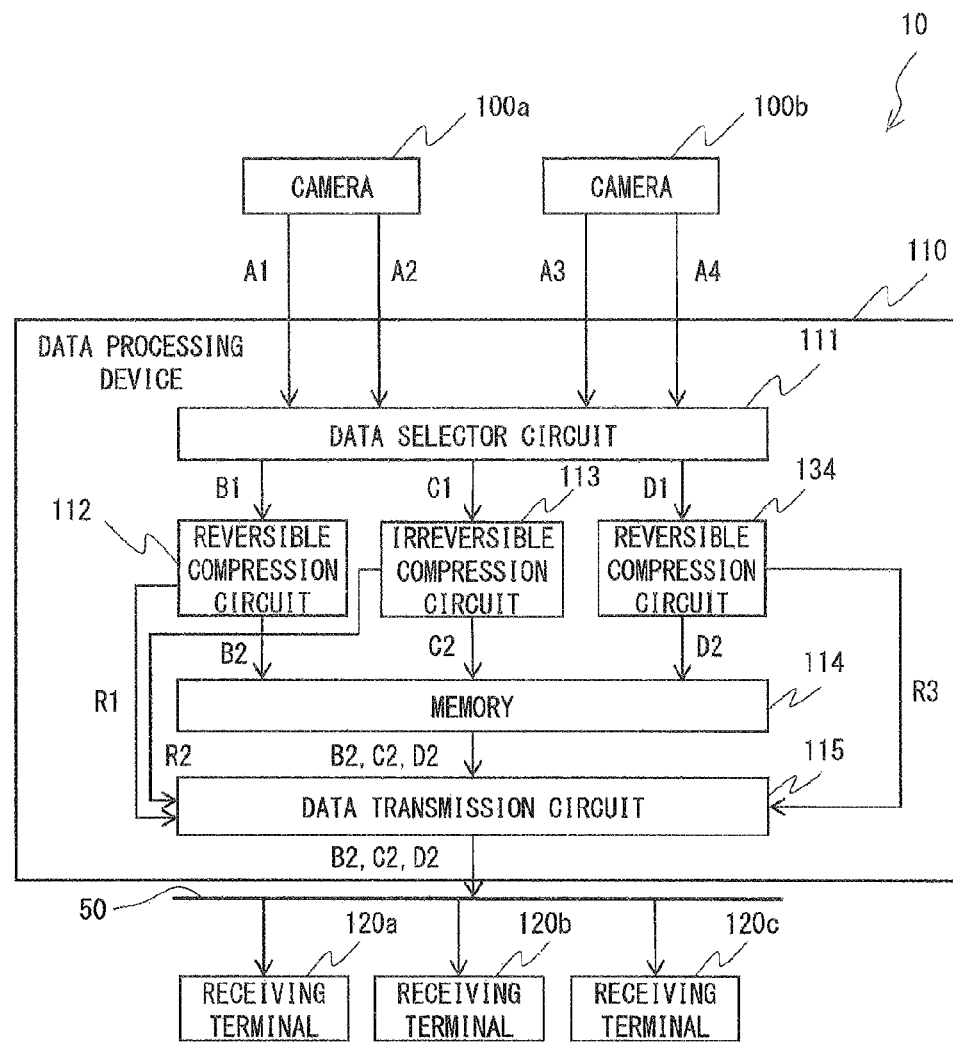
FIG. 4 is a view showing a data processing system according to a first alternative example of the first embodiment.

FIG. 4 is a view showing the data processing system 10 according to a first alternative example of the first embodiment. FIG. 4 illustrates the case where three or more types of data are input to the data processing device 110. To be specific, in FIG. 4, the data processing system 10 includes two cameras 100a and 100b. Further, in FIG. 4, the data processing device 110 includes a reversible compression circuit 134 in addition to the reversible compression circuit 112 and the irreversible compression circuit 113.

The camera 100a outputs the camera data A1 including YUV color image data and distance data and the data control signal A2 related to the camera data A1, just like the camera 100 in FIG. 2 does. On the other hand, the camera 100b outputs camera data A3 including, for example, IR image data and a data control signal A4 related to the camera data A3. The data control signal A4 has the same structure as that of the data control signal A2.

The data selector circuit 111 divides the camera data A1 into the YUV color image data and the distance data based on the data control signal A2 as described above. Then, the data selector circuit 111 outputs the distance data as the data B1 to the reversible compression circuit 112 and outputs the YUV color image data as the data C1 to the irreversible compression circuit 113. Further, the data selector circuit 111 outputs the IR image data included in the camera data A3 as data D1 to the reversible compression circuit 134 based on the data control signal A4. Thus, in this example, the IR image data is data for which reversible compression is effective, i.e., the data is data to be computed in the receiving terminal 120.

The processing operations of the reversible compression circuit 112 and the irreversible compression circuit 113 are the same as those described with reference to FIG. 2 and thus are not redundantly described. The reversible compression circuit 134 performs reversible compression on the data D1 and stores the obtained compressed data D2 in the memory 114 in the same manner as that of the reversible compression circuit 112. Further, the reversible compression circuit 134 outputs a data transmission request signal R3 that reports the completion of compression to the data transmission circuit 115. The data transmission circuit 115 thereby transmits the compressed data D2 to the receiving terminal 120.

As described above, this embodiment is also applicable to the case where there are three types of data. Further, in the case where there are four or more types of data, the compression circuit(s) may be added in parallel according to the number of types. Note that, by placing a memory in the data selector circuit 111, it is possible to perform the compression on each of a plurality of types of data without increasing the number of compression circuits. Note that, in the example of FIG. 4, when the IR image data is data for which irreversible compression is effective, i.e., the data is data to be viewed by a user in the receiving terminal 120, an irreversible compression circuit may be placed instead of the reversible compression circuit 134. Further, although in the case where there are a plurality of cameras 100 is shown in FIG. 4, the camera data A1 that includes three or more types of data may be output from one camera 100.

Figure 5:
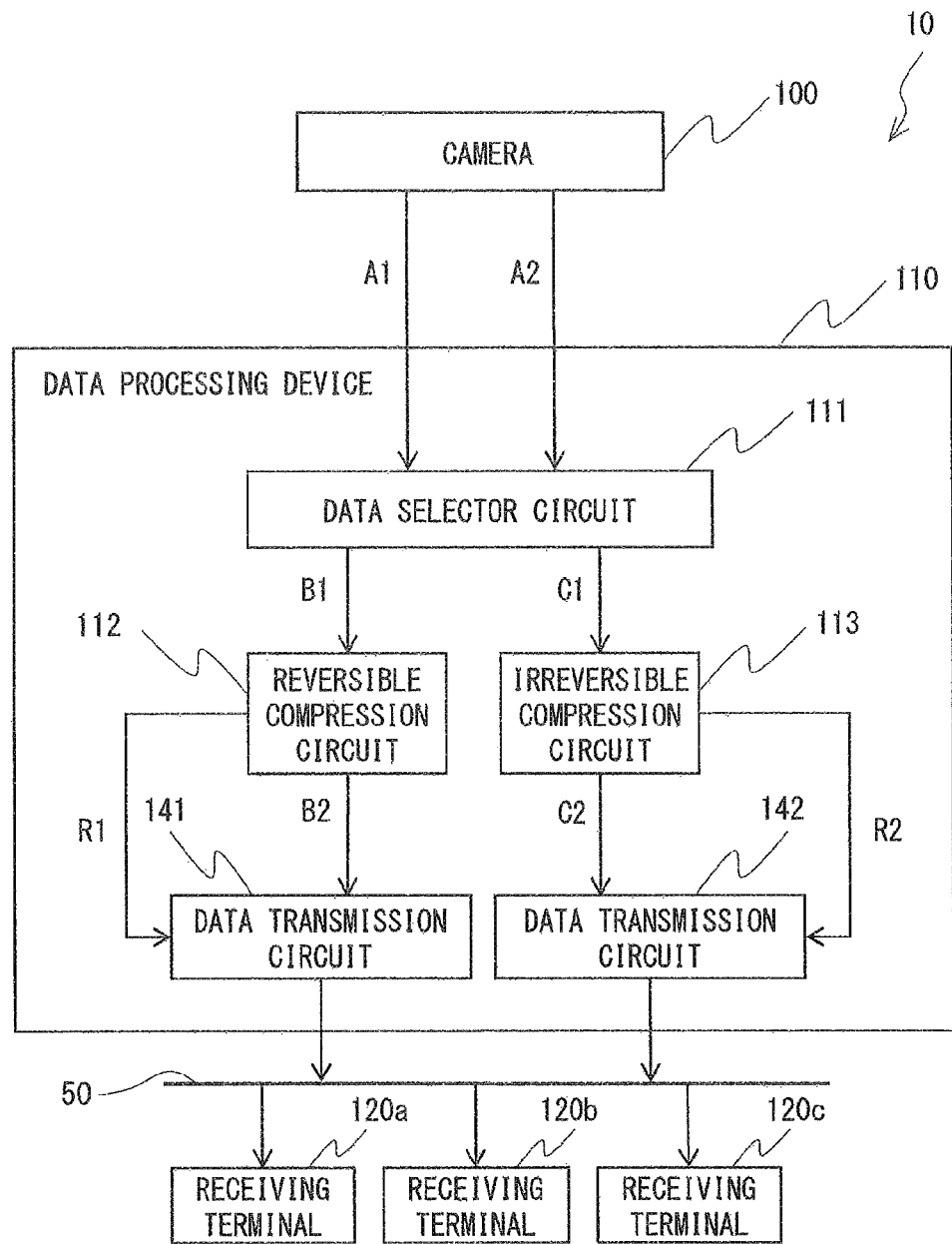
FIG. 5 is a view showing a data processing system according to a second alternative example of the first embodiment.

FIG. 5 is a view showing the data processing system 10 according to a second alternative example of the first embodiment. In the example of FIG. 5, a plurality of data transmission circuits are placed respectively for the compressed data B2 from the reversible compression circuit 112 and the compressed data C2 from the irreversible compression circuit 113. To be specific, in the example of FIG. 5, the data processing device 110 includes a data transmission circuit 141 for transmitting the compressed data B2 and a data transmission circuit 142 for transmitting the compressed data C2. In the example of FIG. 5, the data processing device 110 does not need to include the memory 114.

The reversible compression circuit 112 outputs the compressed data B2 to the data transmission circuit 141. At this time, the reversible compression circuit 112 outputs the data transmission request signal R1 that reports the completion of compression to the data transmission circuit 141. The data transmission circuit 141 receives the data transmission request signal R1 and thereby transmits the compressed data B2 output from the reversible compression circuit 112 to the receiving terminal 120.

The irreversible compression circuit 113 outputs the compressed data C2 to the data transmission circuit 142. At this time, the irreversible compression circuit 113 outputs the data transmission request signal R2 that reports the completion of compression to the data transmission circuit 142. The data transmission circuit 142 receives the data transmission request signal R2 and thereby transmits the compressed data C2 output from the irreversible compression circuit 113 to the receiving terminal 120.

In the example of FIG. 5, the data transmission circuit 141 for transmitting the compressed data B2 and the data transmission circuit 142 for transmitting the compressed data C2 are placed separately. Thus, even without a memory that temporarily stores the compressed data, the data processing device 110 can transmit the compressed data B2 from the reversible compression circuit 112 and the compressed data C2 from the irreversible compression circuit 113 separately with no data loss.

Figure 6:
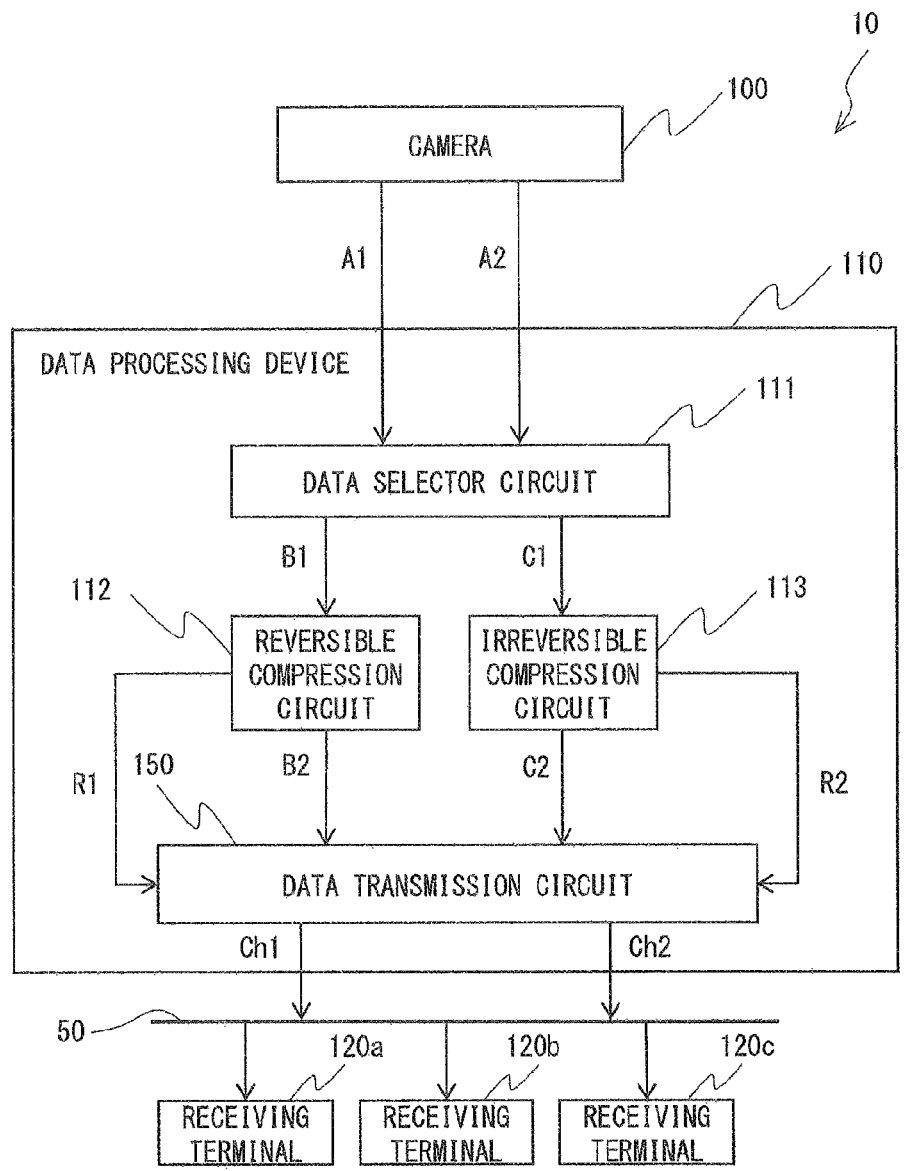
FIG. 6 is a view showing a data processing system according to a third alternative example of the first embodiment.

FIG. 6 is a view showing the data processing system 10 according to a third alternative example of the first embodiment. In the example of FIG. 6, a channel Ch1 and a channel Ch2 respectively for transmitting the compressed data B2 from the reversible compression circuit 112 and the compressed data C2 from the irreversible compression circuit 113 are placed separately. To be specific, in the example of FIG. 6, the data processing device 110 includes a data transmission circuit 150 compatible with the channel Ch1 and the channel Ch2. In the example of FIG. 6, the data processing device 110 does not need to include the memory 114.

The reversible compression circuit 112 outputs the compressed data B2 to the data transmission circuit 150. At this time, the reversible compression circuit 112 outputs the data transmission request signal R1 that reports the completion of compression to the data transmission circuit 150. The data transmission circuit 150 receives the data transmission request signal R1 and thereby transmits the compressed data B2 to the receiving terminal 120 through the channel Ch1.

The irreversible compression circuit 113 outputs the compressed data C2 to the data transmission circuit 150. At this time, the irreversible compression circuit 113 outputs the data transmission request signal R2 that reports the completion of compression to the data transmission circuit 150. The data transmission circuit 150 receives the data transmission request signal R2 and thereby transmits the compressed data C2 to the receiving terminal 120 through the channel Ch2.

In the example of FIG. 6, the channel Ch1 and the channel Ch2 for transmitting the compressed data B2 and the compressed data C2, respectively, are placed separately. Thus, even without a memory that temporarily stores the compressed data, the data processing device 110 can transmit the compressed data B2 from the reversible compression circuit 112 and the compressed data C2 from the irreversible compression circuit 113 separately with no data loss.

Second Embodiment

Figure 7:
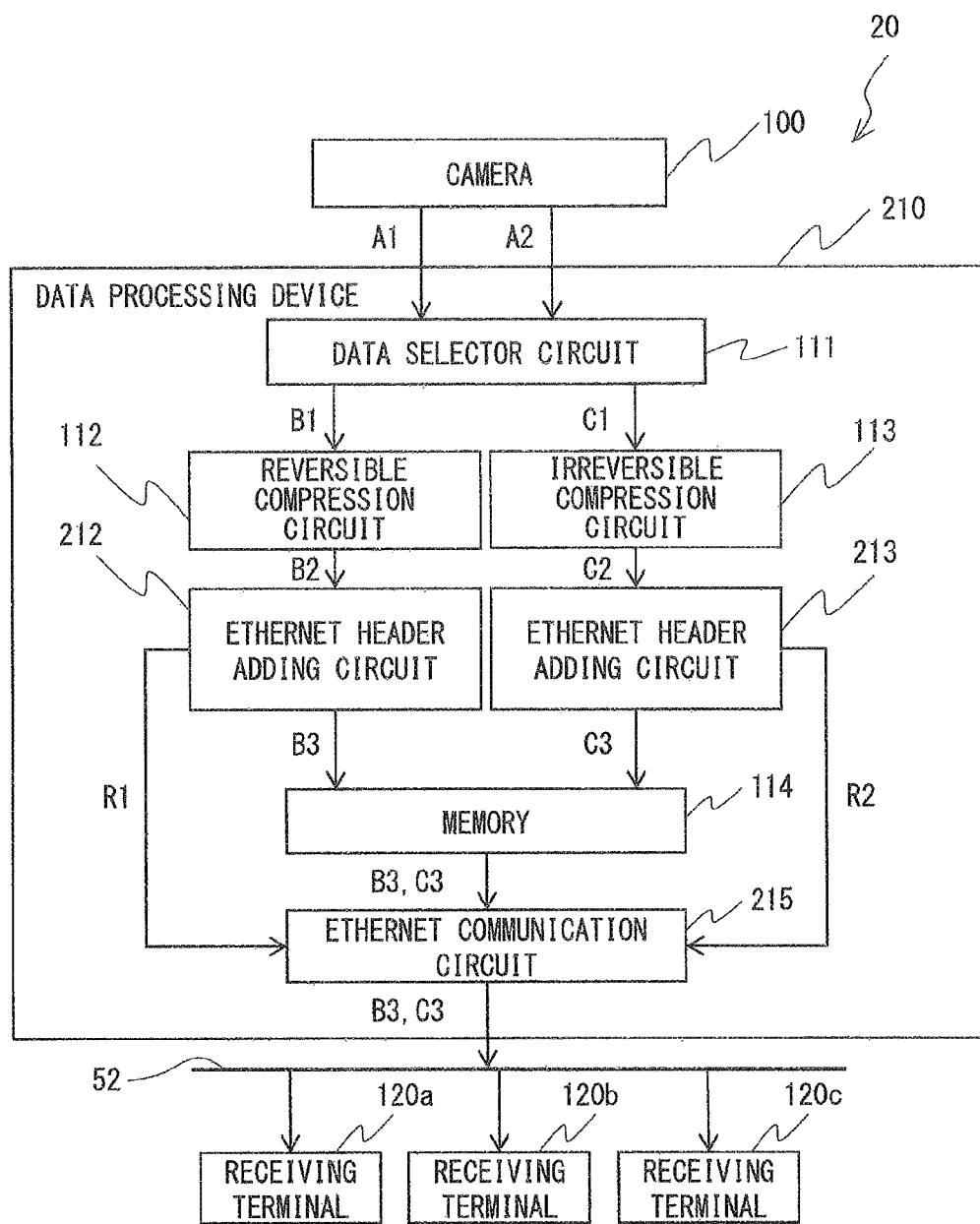
FIG. 7 is a view showing a data processing system according to a second embodiment.

FIG. 7 is a view showing a data processing system 20 according to a second embodiment. In the second embodiment, the data processing system communicates with a receiving terminal in a format compliant with Ethernet (registered trademark).

The data processing system 20 includes a camera 100, a data processing device 210, and a receiving terminal 120 (receiving terminals 120a, 120b and 120c). The data processing device 210 is connected to be able to communicate with the receiving terminal 120 through a communication line 52 compliant with, for example, Ethernet. The data processing device 210 includes a data selector circuit 111, a reversible compression circuit 112, an irreversible compression circuit 113, an Ethernet header adding circuit 212, an Ethernet header adding circuit 213, a memory 114, and an Ethernet communication circuit 215. Thus, in the second embodiment, the Ethernet header adding circuit 212 and the Ethernet header adding circuit 213 are added, and the Ethernet communication circuit 215 replaces the data transmission circuit 115. The other elements are the same as those of the first embodiment and not redundantly described.

Figure 8:
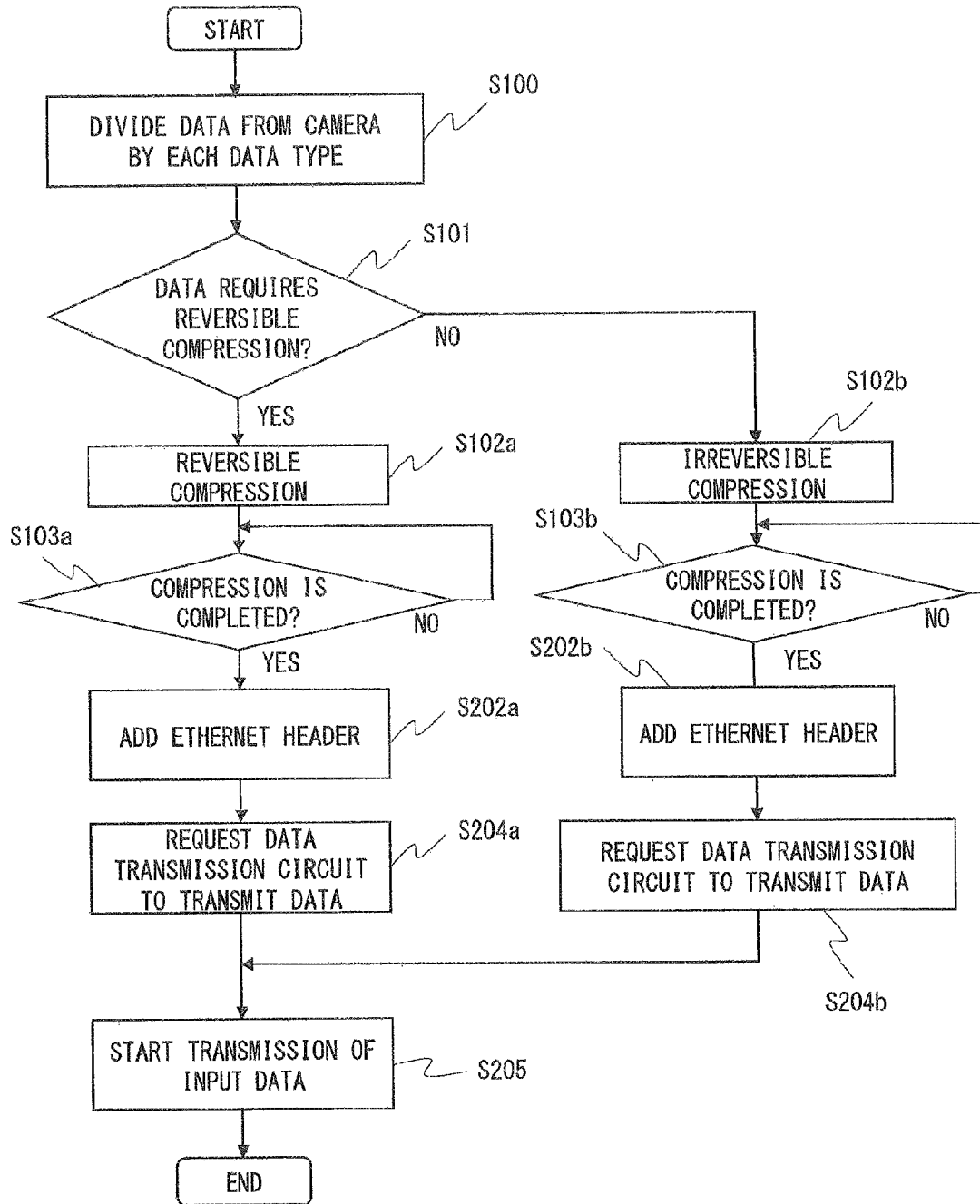
FIG. 8 is a flowchart showing a data processing method in the data processing device according to the second embodiment.

FIG. 8 is a flowchart showing a data processing method in the data processing device 210 according to the second embodiment. In FIG. 8, the description of the same processing steps (S100 to S103) as in the first embodiment is omitted. The operation of each circuit of the data processing device 210 is described hereinafter with reference to FIG. 8.

The reversible compression circuit 112 performs compression and outputs the compressed data B2 to the Ethernet header adding circuit 212. The Ethernet header adding circuit 212 adds an Ethernet header related to the compressed data B2 to the compressed data B2 (S202a). Then, the Ethernet header adding circuit 212 writes the compressed data B3 with the Ethernet header added in a predetermined area in the memory 114. In the second embodiment, when the Ethernet header adding circuit 212 adds the Ethernet header, the Ethernet header adding circuit 212 outputs the data transmission request signal R1 to the Ethernet communication circuit 215. The Ethernet header adding circuit 212 thereby requests the Ethernet communication circuit 215 to transmit data (S204a).

The irreversible compression circuit 113 performs compression and outputs the compressed data C2 to the Ethernet header adding circuit 213. The Ethernet header adding circuit 213 adds an Ethernet header related to the compressed data C2 to the compressed data C2 (S202b). Then, the Ethernet header adding circuit 213 writes the compressed data C3 with the Ethernet header added in a predetermined area in the memory 114. In the second embodiment, when the Ethernet header adding circuit 213 adds the Ethernet header, the Ethernet header adding circuit 213 outputs the data transmission request signal R2 to the Ethernet communication circuit 215. The Ethernet header adding circuit 213 thereby requests the Ethernet communication circuit 215 to transmit data (S204b).

The Ethernet communication circuit 215 starts transmission of the compressed data input from the memory 114 (S205). To be specific, when the Ethernet communication circuit 215 receives the data transmission request signal R1, it extracts the compressed data B3 with the header from the memory 114. Then, the Ethernet communication circuit 215 transmits the compressed data B3 with the header to the receiving terminal 120 in a format compliant with Ethernet. On the other hand, when the Ethernet communication circuit 215 receives the data transmission request signal R2, it extracts the compressed data C3 with the header from the memory 114. Then, the Ethernet communication circuit 215 transmits the compressed data C3 with the header to the receiving terminal 120 in a format compliant with Ethernet.

In the second embodiment, the data processing device 210 can transmit the compressed data to the receiving terminal 120 in a format compliant with Ethernet. Thus, for a plurality of data processing devices 210 and a plurality of receiving terminals 120 (receiving terminals 120a, 120b and 120c), a network configuration such as a bus type or a star type can be constructed. Further, a cable used in Ethernet communications may have high tolerance to noise compared with a cable in an analog format and a cable in a LVDS (Low voltage differential signaling) format. Thus, a shield film may not be required for the cable used in Ethernet communications. Therefore, by transmitting the compressed data in a format compliant with Ethernet, the cable can be thinner, which makes wiring easy. This also allows the use of an inexpensive cable. This is particularly effective in the case where a digital camera is connected to the device in a vehicle or the like.

Further, in the second embodiment, an Ethernet header is added to the compressed data. The Ethernet header contains information such as a time stamp that is defined by Ethernet (registered trademark) AVB or the like. By using such information, when the data processing device 210 receives a plurality of different camera data from a plurality of cameras 100 and the like, it is possible to synchronize a plurality of image data and the like respectively contained in the plurality of camera data. This is particularly effective in the case where the top view monitor technology that combines a plurality of image data obtained using a plurality of cameras is employed.

Note that, also in the second embodiment, the reversible compression circuit 112 and the irreversible compression circuit 113 are placed in parallel. Thus, substantially the same advantageous effects as in the first embodiment are obtained in the second embodiment as well.

Alternative Example of Second Embodiment

Figure 9:
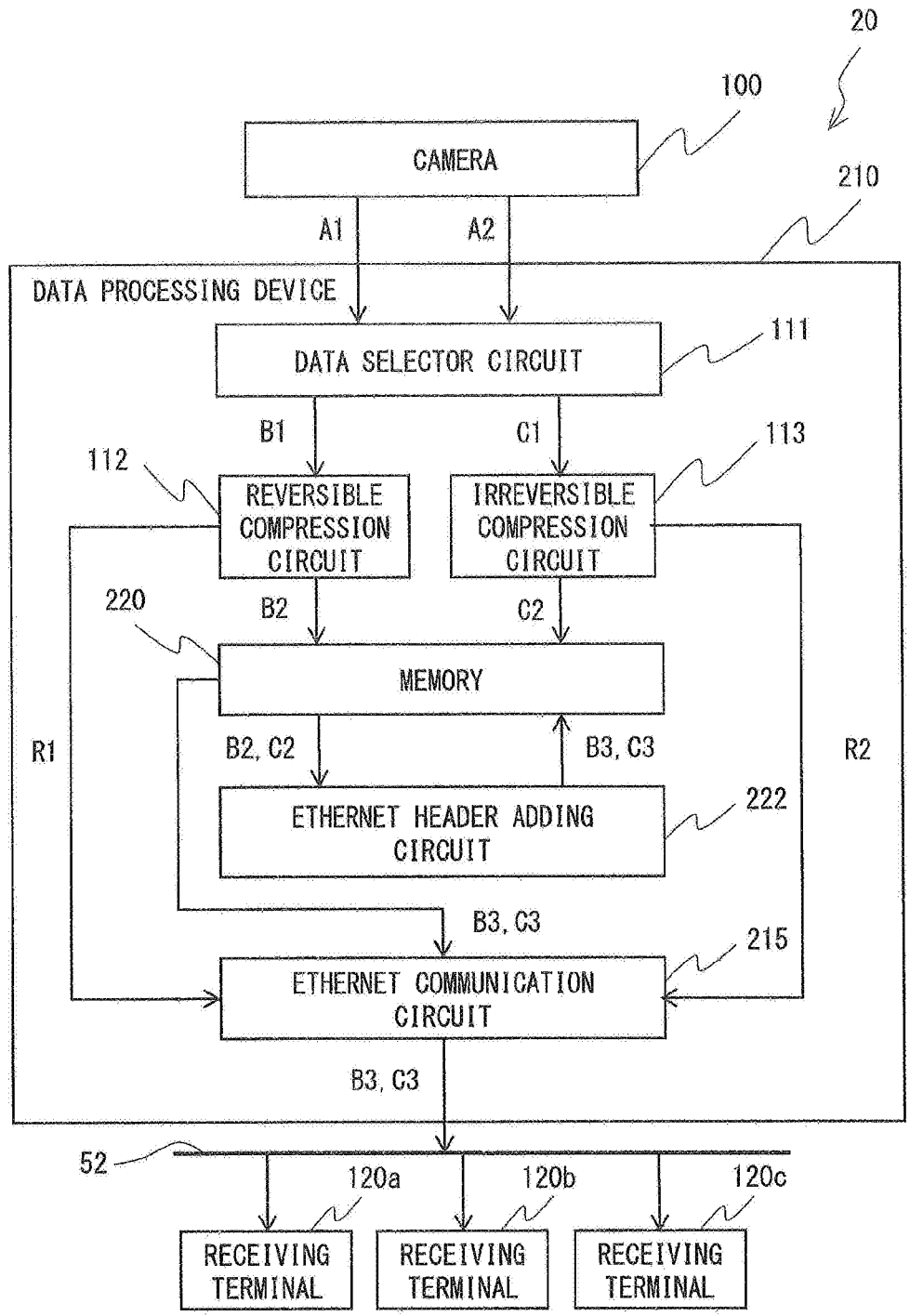
FIG. 9 is a view showing a data processing system according to a first alternative example of the second embodiment.

FIG. 9 is a view showing the data processing system 20 according to a first alternative example of the second embodiment. In FIG. 9, compared with FIG. 7, the positions of the memory and the Ethernet header adding circuit are replaced.

To be specific, in the example of FIG. 9, the data processing device 210 includes a memory 220 in place of the memory 114 and includes an Ethernet header adding circuit 222 in place of the Ethernet header adding circuit 212 and the Ethernet header adding circuit 213. In FIG. 9, the reversible compression circuit 112 stores the compressed data B2 in the memory 220 in the same manner as in the example of FIG. 2. At this time, the reversible compression circuit 112 outputs the data transmission request signal R1 to the Ethernet communication circuit 215. Further, after the compressed data B2 is stored in the memory 220, the Ethernet header adding circuit 222 adds an Ethernet header to the stored compressed data B2. The compressed data B3 with the Ethernet header added is thereby stored in the memory 220.

Further, the irreversible compression circuit 113 stores the compressed data C2 in the memory 220 in the same manner as in the example of FIG. 2. At this time, the reversible compression circuit 113 outputs the data transmission request signal R2 to the Ethernet communication circuit 215. Further, after the compressed data C2 is stored in the memory 220, the Ethernet header adding circuit 222 adds an Ethernet header to the stored compressed data C2. The compressed data C3 with the Ethernet header added is thereby stored in the memory 220.

When the Ethernet communication circuit 215 receives the data transmission request signal R1, it extracts the compressed data B3 with the header from the memory 220 and transmits it to the receiving terminal 120 in the same manner as in the example of FIG. 7. On the other hand, when the Ethernet communication circuit 215 receives the data transmission request signal R2, it extracts the compressed data C3 with the header from the memory 220 and transmits it to the receiving terminal 120 in the same manner as in the example of FIG. 7.

In the example of FIG. 9, only one Ethernet header adding circuit is placed. Thus, the circuit scale can be reduced by the size corresponding to one Ethernet header adding circuit compared with the configuration of FIG. 7.

Third Embodiment

Figure 10:
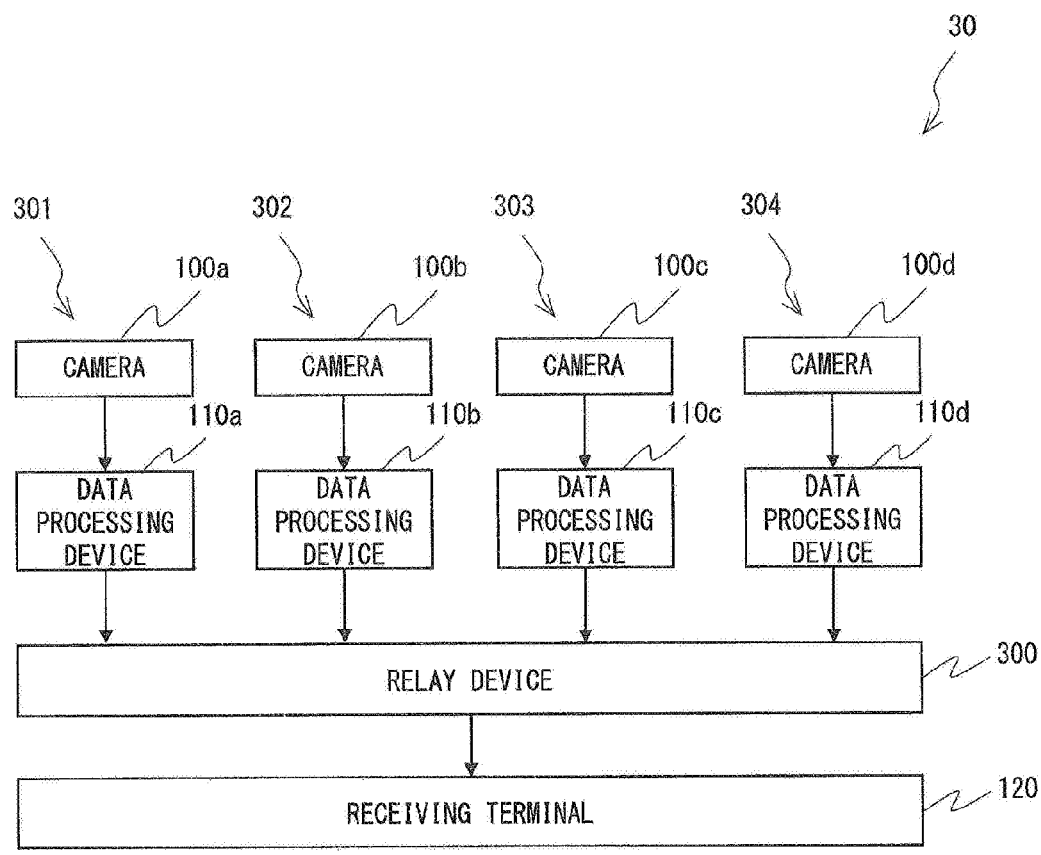
FIG. 10 is a view showing a data processing system according to a third embodiment.

FIG. 10 is a view showing a data processing system 30 according to a third embodiment. The third embodiment is different from the other embodiments in that more than one data processing devices 110 according to the first embodiment are placed. In the third embodiment, more than one data processing devices 210 according to the second embodiment may be placed. In the third embodiment, a network is constructed using a plurality of data processing devices according to the first or second embodiment.

The data processing system 30 includes camera data processing units 301, 302, 303 and 304, a relay device 300, and a receiving terminal 120. The camera data processing unit 301 includes a camera 100a and a data processing device 110a. Likewise, the camera data processing unit 302 includes a camera 100b and a data processing device 110b. The camera data processing unit 303 includes a camera 100c and a data processing device 110c. The camera data processing unit 304 includes a camera 100d and a data processing device 110d. The cameras 100a, 100b, 100c and 100d have substantially the same functions as the camera 100 shown in FIG. 2. Likewise, the data processing devices 110a, 110b, 110c and 110d have substantially the same configuration as the data processing device 110 shown in FIG. 2. Each of the data processing devices 110a, 110b, 110c and 110d transmits the compressed data (compressed data B2 and C2) to the relay device 300.

The relay device 300 is, for example, a hub, a router, or a switching hub in Ethernet or the like. The relay device 300 has the function of relaying the compressed data output from the data processing devices 110a, 110b, 110c and 110d to the receiving terminal 120. The relay device 300 may transmit the compressed data output from the data processing devices 110a, 110b, 110c and 110d as a bundle to the receiving terminal 120. At this time, the compressed data of the camera data respectively obtained at the same timing by the cameras 100a, 100b, 100c and 100d may be synchronized by using the Ethernet header according to the second embodiment.

In the third embodiment, a network is constructed using a plurality of data processing devices. Thus, various processing can be performed in the receiving terminal 120 by using the camera data acquired by a plurality of cameras 100. An example of application of the third embodiment is described hereinafter.

Figure 11:
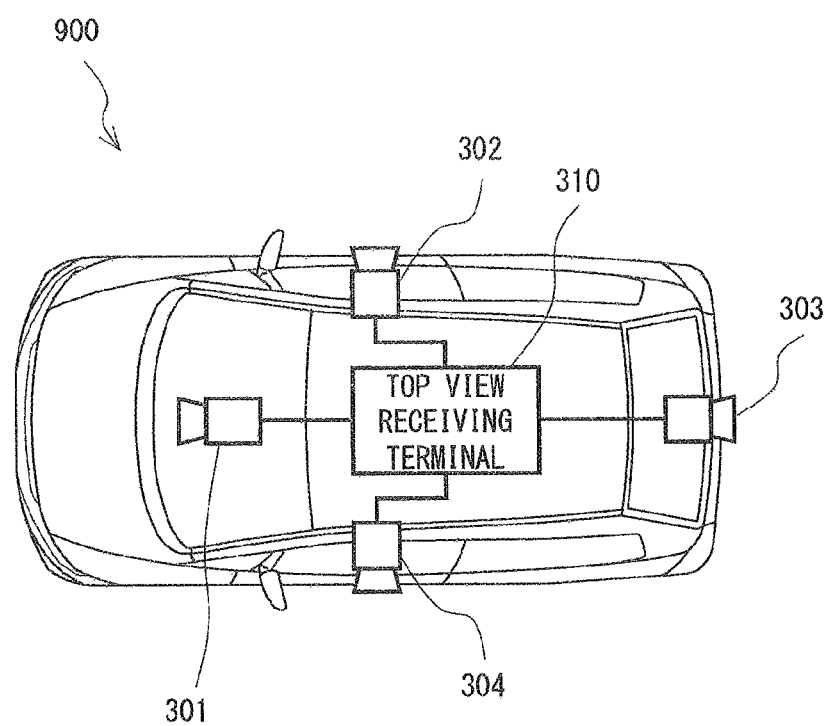
FIG. 11 is a view showing an example where the data processing system according to the third embodiment is mounted on an automobile.

FIG. 11 is a view showing an example where the data processing system 30 according to the third embodiment is mounted on a vehicle 900. Although FIG. 11 shows an example where the system is used for an in-vehicle top view system, it is not limited thereto.

The vehicle 900 includes camera data processing units 301, 302, 303 and 304 and a top view receiving terminal 310. The top view receiving terminal 310 has the functions of the relay device 300 and the receiving terminal 120 shown in FIG. 10. The camera 100a of the camera data processing unit 301 takes an image of the front of the vehicle 900 and acquires the image data related to the front. Further, the camera 100a of the camera data processing unit 301 measures the distance from an object in front of the vehicle 900 and acquires the distance data indicating the measured value. The data processing device 110a of the camera data processing unit 301 acquires camera data that contains the image data and the distance data and performs the compression as described above. Then, the data processing device 110a transmits the compressed data related to the front to the top view receiving terminal 310.

Likewise, the camera data processing unit 302 acquires and compresses the image data and the distance data related to the right side of the vehicle 900 and transmits the compressed data related to the right side to the top view receiving terminal 310. The camera data processing unit 303 acquires and compresses the image data and the distance data related to the back of the vehicle 900 and transmits the compressed data related to the back to the top view receiving terminal 310. The camera data processing unit 304 acquires and compresses the image data and the distance data related to the left side of the vehicle 900 and transmits the compressed data related to the left side to the top view receiving terminal 310.

The top view receiving terminal 310 decompresses the compressed data related to the above-described four directions (front, back, right side and left side) and performs various processing. For example, the top view receiving terminal 310 combines the image data related to the four directions to generate an image related to the top view and displays it on a display.

Further, when there is an object (obstacle) within a certain distance from the vehicle 900 (camera 100) in a certain direction (for example, the left side), the top view receiving terminal 310 performs certain processing to warn a user of that fact. For example, in this case, the top view receiving terminal 310 may output an alarm or change the color of the image data related to the corresponding direction (for example, the left side). As described above, by constructing the system according to the third embodiment, various processing can be performed in the receiving terminal 120.

Alternative Example

This embodiment is not limited to the above-described embodiment, and may be varied in many ways within the scope of the present invention. For example, although the data processing device includes a memory in the above-described embodiment, it may include a data selection logical circuit in place of the memory. The data selection logical circuit is a circuit that receives the compressed data transmitted from a plurality of compression circuits and transmits them to a data transmission circuit. The time it takes for the data selection logical circuit to output the data to the data transmission circuit 115 is shorter than the time required for one-time compression, and therefore it is possible to transmit the compressed data to the data transmission circuit before the next data is output from the compression circuit. Further, the data selection logical circuit may transmit the compressed data to the data transmission circuit in a different order according to setting by the input of an external signal or the like. For example, when it is desired to process the distance data first among the data contained in the camera data, it is possible to transmit the distance data first even when the distance data and the YUV image data are received at the same time.

Further, although the data processing device includes the reversible compression circuit and the irreversible compression circuit in the above-described embodiment, it is not limited thereto. All of a plurality of compression circuits included in the data processing device may be reversible compression circuits or all of them may be irreversible compression circuits.

Further, although a camera outputs a group of data including a plurality of different types of data in the above-described embodiment, a device that outputs a group of data is not limited to a camera. This embodiment is applicable to any device capable of outputting a group of data. For example, a scanner may output a group of data, or a recording device may output a group of data. In the case of a scanner, a group of data may include, for example, image data obtained by scanning and data indicating the features of the image data. Further, in the case of a recording device, a group of data may include data representing a recorded video and data related to the video (a recording time, position data indicating a recording place etc.).

Although embodiments of the present invention are described specifically in the foregoing, the present invention is not restricted to the above-described embodiments, and various changes and modifications may be made without departing from the scope of the invention.

REFERENCE SIGNS LIST

1 DATA PROCESSING DEVICE
2 DATA SELECTOR CIRCUIT
4A FIRST COMPRESSION CIRCUIT
4B SECOND COMPRESSION CIRCUIT
6 DATA TRANSMISSION CIRCUIT
10 DATA PROCESSING SYSTEM
20 DATA PROCESSING SYSTEM
30 DATA PROCESSING SYSTEM
100 CAMERA
110 DATA PROCESSING DEVICE
111 DATA SELECTOR CIRCUIT
112 REVERSIBLE COMPRESSION CIRCUIT
113 IRREVERSIBLE COMPRESSION CIRCUIT
114 MEMORY
115 DATA TRANSMISSION CIRCUIT
120 RECEIVING TERMINAL
134 REVERSIBLE COMPRESSION CIRCUIT
141 DATA TRANSMISSION CIRCUIT
142 DATA TRANSMISSION CIRCUIT
150 DATA TRANSMISSION CIRCUIT
210 DATA PROCESSING DEVICE

212 ETHERNET HEADER ADDING CIRCUIT
213 ETHERNET HEADER ADDING CIRCUIT
215 ETHERNET COMMUNICATION CIRCUIT
220 MEMORY
222 ETHERNET HEADER ADDING CIRCUIT
300 RELAY DEVICE
301 CAMERA DATA PROCESSING UNIT
302 CAMERA DATA PROCESSING UNIT
303 CAMERA DATA PROCESSING UNIT
304 CAMERA DATA PROCESSING UNIT
310 TOP VIEW RECEIVING TERMINAL

The invention claimed is:

1. A data processing device, comprising:
a data selector circuit that divides a plurality of types of data into a further plurality of types of data in accordance with a classification of the data;
a plurality of compression circuits that respectively compress the plurality of types of data in parallel with each other in accordance with each of the plurality of types of data; and
a data transmission circuit that transmits the plurality of types of compressed data to a terminal,
wherein a first compression circuit among the plurality of compression circuits compresses a first type of data among the plurality of types of data in a first format, and a second compression circuit among the plurality of compression circuits compresses a second type of data among the plurality of types of data in a second format different from the first format.

2. The data processing device according to claim 1, wherein the first format is an irreversible compression format, and the second format is a reversible compression format.

3. The data processing device according to claim 2, wherein the first type of data is data to be viewed by a user in the terminal, and the second type of data is data to be computed in the terminal.

4. The data processing device according to claim 1, wherein each of the plurality of compression circuits outputs a data transmission request signal to the data transmission circuit when a compression ends, and
wherein the data transmission circuit transmits each of the plurality of types of compressed data to the terminal based on the data transmission request signal.

5. The data processing device according to claim 1, further comprising:
a memory that stores the plurality of types of data respectively compressed by the plurality of compression circuits.

6. The data processing device according to claim 1, wherein the data transmission circuit transmits the plurality of types of compressed data to the terminal in a format compliant with Ethernet.

7. The data processing device according to claim 6, further comprising:
a header adding circuit that adds an Ethernet header to the data respectively compressed by the plurality of compression circuits,
wherein the data transmission circuit transmits the data with the Ethernet header to the terminal.

8. The data processing device according to claim 1, wherein the data transmission circuit transmits the plurality of types of compressed data separately from one another.

9. The data processing device according to claim 1, wherein the data selector circuit divides a group of data when a data control signal is received from a circuit which has transmitted the group of data.

10. The data processing device according to claim 9, wherein
the data control signal contains information specifying a structure of each of the plurality of types of data in the group of data, and
the data selector circuit divides the group of data based on the data control signal.

11. The data processing device according to claim 1, wherein information specifying a structure of each of the plurality of types of data in the group of data is preset to the data selector circuit.

12. A data processing system, comprising:
a plurality of data processing devices, comprising:
a data selector circuit that divides a plurality of types of data into a further plurality of types of data in accordance with a classification of the data;
a plurality of compression circuits that respectively compress the plurality of types of data in parallel with each other in accordance with each of the plurality of types of data; and
a data transmission circuit that transmits the plurality of types of compressed data to a terminal; and
a relay device that transmits the plurality of types of compressed data transmitted from the plurality of data processing devices to a terminal.

13. A data processing method, comprising:
dividing a plurality of types of data into a further plurality of types of data in accordance with a classification of the data;
compressing the plurality of types of data in parallel with each other in accordance with each of the plurality of types of data; and
transmitting the plurality of types of compressed data to a terminal.

14. The data processing method according to claim 13, wherein a first type of data among the plurality of types of data is compressed in a first format, and a second type of data among the plurality of types of data is compressed in a second format different from the first format.

15. The data processing method according to claim 14, wherein the first format is an irreversible compression format, and the second format is a reversible compression format.

16. The data processing method according to claim 15, wherein the first type of data is data to be viewed by a user in the terminal, and the second type of data is data to be computed in the terminal.

17. The data processing method according to claim 13, wherein the plurality of types of compressed data is transmitted to the terminal in a format compliant with Ethernet.

18. The data processing method according to claim 17, comprising:
adding an Ethernet header to the compressed data; and
transmitting the data with the Ethernet header to the terminal.

19. The data processing system according to claim 12, wherein a first compression circuit among the plurality of compression circuits compresses a first type of data among the plurality of types of data in a first format, and a second compression circuit among the plurality of compression circuits compresses a second type of data among the plurality of types of data in a second format different from the first format.

20. The data processing system according to claim 19, wherein the first format is an irreversible compression format, and the second format is a reversible compression format.

* * * * *